United States Patent Office 3,661,876
Patented May 9, 1972

3,661,876
ADHESIVES OR SEALING AGENTS WHICH HARDEN ON EXCLUSION OF OXYGEN
Bernd Wegemund, Hilden, Rhineland, and Joachim Galinke, Dusseldorf-Holthausen, Germany, assignors to Henkel & Cie GmbH, Dusseldorf-Holthausen, Germany
No Drawing. Filed Mar. 30, 1970, Ser. No. 23,958
Claims priority, application Germany, Apr. 1, 1969, P 19 16 648.4
Int. Cl. C08f 3/64, 15/26
U.S. Cl. 260—86.1                            8 Claims

ABSTRACT OF THE DISCLOSURE

Adhesive compositions hardenable under exclusion of oxygen comprising liquid esters of methacrylic and acrylic acids which harden under exclusion of oxygen, an organic percompound selected from the group consisting of organic hydroperoxides having from 3 to 18 carbon atoms and organic peroxides whose half life decomposition temperature after 10 hours is greater than 85° C., and at least 10% by weight of a compound of the formula $$CH_2=C-COOR$$
$$\;\;\;\;\;|$$
$$\;\;\;\;\;O-C-C=CH_2$$
$$\;\;\;\;\;\;\;\;\;\parallel\;\;|$$
$$\;\;\;\;\;\;\;\;\;O\;\;X$$

wherein X represents a member selected from the group consisting of hydrogen, halogen and lower alkyl and R represents a hydrocarbon having from 1 to 12 carbon atoms. Said compositions form a heat-stable adhesive bond.

THE PRIOR ART

Adhesives or sealing compositions which harden on exclusion of oxygen and based on mixtures of esters of methacrylic acid or acrylic acid and organic hydroperoxides are known. Thus, mixtures containing esters of acrylic or methacrylic acids with cycloaliphatic alcohols, in which one or two $CH_2$ groups of the cycloaliphatic ring may possibly be replaced by oxygen, lead to firm bonds between the parts bonded together. The strength of these adhesive bonds falls off greatly at elevated temperatures however. As described in our copending application Ser. No. 767,493, filed Oct. 14, 1968, this disadvantage can be reduced if acrylic acid esters of such cycloaliphatic monoalcohols, possibly substituted in the α-position, are used which are derived from dimerized or polymerized cyclopentadiene. However, a still undesirable falling off of the heat stability is present in the case of these products.

OBJECTS OF THE INVENTION

An object of the present invention is the development of an adhesive or sealing composition based on mixtures of acrylic acid and substituted acrylic acid esters which composition hardens on exclusion of oxygen to give adhesive bonds with improved heat stability.

Another object of the present invention is the obtaining of adhesive compositions hardenable under exclusion of oxygen comprising liquid esters of methacrylic and acrylic acids which harden under exclusion of oxygen, an organic percompound selected from the group consisting of organic hydroperoxides having from 3 to 18 carbon atoms and organic peroxides whose half life decomposition temperature after 10 hours is greater than 85° C., and at least 10% by weight of a compound of the formula $$CH_2=C-COOR$$
$$\;\;\;\;\;|$$
$$\;\;\;\;\;O-C-C=CH_2$$
$$\;\;\;\;\;\;\;\;\;\parallel\;\;|$$
$$\;\;\;\;\;\;\;\;\;O\;\;X$$

wherein X represents a member selected from the group consisting of hydrogen, halogen and lower alkyl and R represents a hydrocarbon having from 1 to 12 carbon atoms.

A further object of the present invention is, in the process of forming adhesive bonds between solid material comprising interposing a layer of liquid esters which harden under exclusion of oxygen of acids of the formula $$CH_2=\underset{\underset{R'}{|}}{C}-COOH$$

wherein R′ is a member selected from the group consisting of hydrogen, lower alkyl and halogen, with alcohols, said esters containing from about 0.1% to about 20% of an organic percompound selected from the group consisting of organic hydroperoxides having from 3 to 18 carbon atoms and organic peroxides whose half life decomposition temperature after 10 hours is greater than 85° C., between said solid materials and excluding oxygen from said layer, the improvement which consists in adding to said liquid esters a compound of the formula $$CH_2=C-COOR$$
$$\;\;\;\;\;|$$
$$\;\;\;\;\;O-C-C=CH_2$$
$$\;\;\;\;\;\;\;\;\;\parallel\;\;|$$
$$\;\;\;\;\;\;\;\;\;O\;\;X$$

wherein X represents a member selected from the group consisting of hydrogen, halogen and lower alkyl and R represents a hydrocarbon having from 1 to 12 carbon atoms, in an amount sufficient to increase the stability of the resultant adhesive bond at temperatures over 100° C.

These and other objects of the invention will become more apparent as the description thereof proceeds.

DESCRIPTION OF THE INVENTION

It has now been found that the heat stability of adhesive bonds is improved when utilizing an adhesive or sealing composition which hardens on exclusion of oxygen comprising an optionally substituted acrylic acid ester and an organic peroxide and having a content of a compound of the general formula $$H_2C=C-COOR$$
$$\;\;\;\;\;|$$
$$\;\;\;\;\;O-C-C=CH_2$$
$$\;\;\;\;\;\;\;\;\;\parallel\;\;|$$
$$\;\;\;\;\;\;\;\;\;O\;\;X$$

in which R represents a hydrocarbon residue having from 1 to 12 carbon atoms, and X represents a hydrogen or halogen atom or a lower alkyl residue. X preferably represents a hydrogen atom or a methyl group of a chlorine atom.

The residue R in the above formula is preferably a methyl residue or a lower aliphatic alkyl or alkenyl residue containing 2 to 4 carbon atoms. However, R may also be another aliphatic alkyl or alkenyl residue with 5 to 12 carbon atoms or an aromatic residue such as phenyl or phenylalkyl having from 7 to 12 carbon atoms such as benzyl or a cycloaliphatic residue possibly containing hetero atoms, such as cycloalkyl having from 4 to 7 carbon atoms and cyclooxyalkyl-alkyl having from 5 to 6 carbon atoms. For example, cyclopentyl, cyclohexyl or tetrahydrofurfuryl residues are suitable.

Compositions which harden on exclusion of oxygen, of the invention may contain (a) From 0 to 90%, preferably from 55% to 90% by weight, of liquid esters of methacrylic and acrylic acid which harden under exclusion of oxygen;

(b) From 10% to 99.5%, preferably from 10% to 45% by weight of a compound of the formula

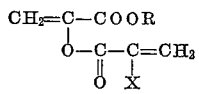

wherein X represents a member selected from the group consisting of hydrogen, halogen and lower alkyl and R represents a hydrocarbon having from 1 to 12 carbon atoms;

(c) From 0.1% to 20%, preferably from 0.5% to 10%, by weight of a percompound selected from the group consisting of organic hydroperoxides having from 3 to 18 carbon atoms and organic peroxides whose half life decomposition temperature after 10 hours is greater than 85° C.; and (d) From 0 to 40% by weight of customary adhesive additives selected from the group consisting of unsaturated organic acids, unsaturated organic acid amides, unsaturated organic polyesters, thickeners, plasticizers, inorganic fillers, dyestuffs, stabilizers and accelerators.

In the mixtures according to the invention, the ester according to the above formula contained in said mixtures is generally not the only compound able to harden with exclusion of oxygen. A noticeable improvement of the heat stability of the bond is already attained with the replacement of 10% to 30% by weight of the usual mixtures hardening on exclusion of oxygen which are based on acrylic acid esters of the acyloxyacrylic acid esters of the invention, the percentage figure being referred to the total content of acrylic esters.

The acyloxy-acrylic acid esters to be used according to the invention are known per se. The starting point for their preparation is suitably β-chlorolactic acid ester and this is condensed with an acrylic acid chloride, possibly substituted in the α-position, in the presence of an HCl acceptor (I) 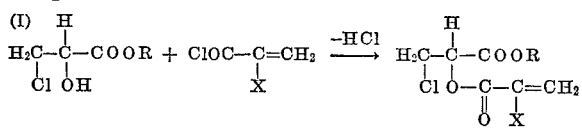

By removal of further HCl from the ester so formed, an acrylic ester substituted in the α-position by an acryloyloxy residue is then obtained.

(II) 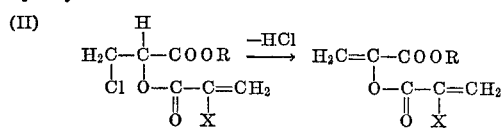

X and R have the above assigned values.

As already mentioned, the acryloyloxyacrylic acid esters to be used according to the invention are preferably used together with the known acrylic acid esters which harden, on exclusion of oxygen. These known compounds may be, for example, esters of acrylic or methacrylic acids with cycloaliphatic alcohols for example, cycloalkanols having 4 to 7 carbon atoms, alkylcycloalkanols having 5 to 11 carbon atoms, cycloalkylalkanols having 5 to 11 carbon atoms and their mono- and dioxa derivatives, such as cyclohexanol, methylcyclohexanol, cyclopentanol, methylcyclopentanol, methylolcyclohexane, methylolcyclopentane, tetrahydrofurfuryl alcohol and 1,3-dioxa-2,2-dimethyl-4-methylolcyclopentane.

Specially good results are obtained if the acryloyloxyacrylic acid esters used according to the invention are added to esters, able to harden with the exclusion of oxygen, of acrylic or methacrylic acid with dimerized and polymerized cyclopentadiene alcohols such as dihydrodicyclopentadienol.

Of course it is also possible to add the acryloyloxyacrylic acid esters used according to the invention to the mono- or di-esters of acrylic or methacrylic acids with polyhydric alcohols. These also include known esters which are able to harden with the exclusion of oxygen, of acrylic or methacrylic acid with, for example alkanediols having 2 to 12 carbon atoms, polyoxyethylene glycols, thiodialkylene glycols having from 4 to 8 carbon atoms, di-lower-alkanolamines and tri-lower-alkanolamines, such as ethylene glycol, diethylene glycol, triethylene glycol, thiodiethylene glycol, propylene glycol, diethanolamine or tripropanolamine.

The mixtures according to the invention should furthermore contain the organic percompounds known to be suitable for this purpose. The use of organic hydroperoxides, which are derived from hydrocarbons which contain 3 to 18 carbon atoms, is advantageous. For example, tert.-butylhydroperoxide, cumenehydroperoxide, methylethylketone hydroperoxide, and diisopropylbenzene hydroperoxide are suitable. Also suitable are organic peroxides whose temperature at which the peroxides are half decomposed after 10 hours is greater than 85° to 90° C. These peroxides include, for example, tert.-butylperbenzoate, 2,2-bis-(tert.-butylperoxy)-butane, bis-(1-hydroxycyclohexyl)-peroxide and tert.-butylperoxyisopropyl carbonate. The amount of peroxide used lies between about 0.1% to 20%, especially 0.5 to 10% by weight, referred to the total weight of the mixture.

The mixture according to the invention may contain in the usual way further additives which have a favorable action on the properties of the mixture or on the bonds produced therewith. Thus, in some cases it is expedient to add also small amounts of unsaturated acids, for example, lower alkenoic acids such as acrylic acid, methacrylic acid or itaconic acid or their amides such as acrylamide etc. The addition of unsaturated polyesters also frequently has a favorable effect on the properties of the bonds produced. These unsaturated compounds may be present in amounts of from 0 to about 5%, preferably 0.1 to 2%, by weight.

In some cases it is advantageous to add thickeners, plasticizers and inorganic fillers or dyestuffs to the mixtures of the invention. Suitable thickeners are polymeric compounds such as polymethylmethacrylate, polyethylacrylate, polystyrene, polyvinyl chloride, and co-polymers of butadiene with acrylonitrile or styrene and the like which are soluble in the liquid acrylate esters. Example of plasticizers which may be used are phthalates such as dioctyl phthalate or dibutyl phthalate, or esters of sebacic acid with alcohols such as butanol, octanol or decanol, or phosphoric acid esters such as tricresyl phosphate or sulphonic acid ester such as the ester of octadecylsulphonic acid and cresol or phenol. Suitable fillers are, for example, finely divided silicon dioxide, bentonites, calcium carbonate, titanium dioxide and the like. The thickeners and/or fillers as well as the plasticizers, unsaturated acids, and dyestuffs may be added in amounts of from 0 to about 40% by weight.

In many cases it is expedient to add stabilizers or accelerators to the mixtures of the invention. Suitable stabilizers are, for example, those employed as polymerization inhibitors for polymerizable monomers such as hydroquinone, quinone, 2,5-di-tert.-butylhydroquinone, N,N'-diphenylbenzidine, etc. The stabilizers, if added, are added in very small amounts in the order of from 0.001% to 0.1% of the mixture. Suitable accelerators are aliphatic or aromatic tertiary amines, for example tri-lower-alkylamines such as triethylamine, tributylamine, di-lower-alkylphenylamines such as dimethylaniline, p-dimethyltoluidine, sulphenamides such as N-diethyl-2-benzothiazylsulphenamide or N-methyl-N-cyclohexyl-benzothiazyl-sulpenamide, and sulphimides such as benzoic acid sulphimide. The accelerators are generally added only in small amounts of 0.1 to 5%. Of course, the mixtures of the invention can be free of added stabilizers or accelerators, therefore the mixtures of the invention can contain from 0 to 0.1% of stabilizers by weight and from 0 to 0.5% of accelerators by weight.

If the mixtures according to the invention are to be used for bonding or sealing glass, plastics or metals catalytically less active such as zinc, cadmium high-alloy steels or anodized aluminum, it is advantageous to treat these materials prior to their utilization with metal salts of accelerating effectiveness, for example, copper or cobalt napththenate, or with polyamines such as, for example, diethylenetriamine or mercaptans such as mercaptobenzthiazole, or with substances containing isocyanate groups such as triphenylmethane triisocyanate, or adducts of isocyanates to amines, sulphamides, or polyesters. This pretreatment may be carried out by dipping, brushing or spraying the parts with dilute solutions of the said compounds. On the other hand, it is not advisable to add such compounds to the mixtures of the invention at the beginning, since they greatly reduce the storability of the mixtures.

The mixtures according to the invention have an excellent stability against polymerization when exposed to the air or in the presence of small amounts of oxygen. In comparison with the prior art mixtures, they are distinguished by the fact, that after hardening, they give a layer of polymerisate with an increased stability to high temperatures, particularly those over 100° C.

The adhesives or sealing agents according to the invention find technical application for the fixing screws in their threads, sealing screwed joints, fixing jointed parts or sealing fingers. The adhesive compositions of the invention may particularly be utilized in the bonding or sealing of parts on such machines and apparatuses which operate at high temperatures or which undergo a temperature increase in operation. The co-adhesive compositions of the invention are particularly useful in the automotive and electrical industry as well as in bonding parts in wrapping machines which lay down melted adhesives.

In use, small amounts of the adhesive compositions of the invention hardenable on exclusion of oxygen are applied to the surfaces to be joined together. These surfaces are joined in such a way that air or oxygen is excluded from the joint. After a short period of time, of, for example from ½ to 3 hours, an adhesive bond is obtained, which bond attains its ultimate strength after abuot 4 to 48 hours. If so desired, the hardening process can be accelerated by heating the junction.

The following specific embodiments are illustrative of the practice of the invention. It is to be understood, however, that they are not to be deemed limitative in any manner.

Preparation of the methyl ester of α-methacryloyloxyacrylic acid 287 g. (2.75 mols) of methyl β-chlorolactate were dissolved in 1 liter of anhydrous benzene in a 4-liter flask provided with a reflux condenser and protected in the usual way against the entrance of moisture. 381 g. (2.75 mols) of methacrylyl chloride and 0.5 g. of hydroquinone were then added and, with stirring and initial cooling, 555 g. (5.5 mols) of triethylamine in 200 ml. of anhydrous benzene were then added in the course of an hour. The temperature was then allowed to rise to about 60° C. and the mixture was heated for 5 hours under reflux. After cooling, the precipitated salt was filtered off by suction, the filter cake was then washed with ether and the solvent was distilled off the combined filtrates.

440 g. of crude product were obtained. A subsequent fractional distillation with addition of a phenolic inhibitor yielded the pure methyl α-methacryloyloxy-acrylate (boiling point 40° C. at 1 torr; $n_C^{20}$=1.454): The yield amounted to 342 g. (73.5% of theory).

In the measurements of compressive shear strength given in the following examples, an advance rate of 50 mm./minute was utilized.

EXAMPLE 1

0.8 g. of polystyrene were dissolved in a mixture of 6.6 g. of the methacrylic acid ester of 5,6-dihydrodicyclopentadienol and 2.0 g. of methyl α-methacryloyloxyacrylate. The two monomers had been stabilized with 0.006% of hydroquinone. Then 0.5 g. of a 70% commercial solution of cumene hydroperoxide in a cumene and 0.1 g. of tributylamine were added. The mixture so obtained was stable for months at room temperature in a half-filled bottle.

Rust-free and oil-free bearing shafts (steel; diameter 25 mm.) were joined to cylinder rings (steel; bore 25.2 mm., height 10 mm.) with this mixture.

After storing the sample at room temperature for 10 weeks, the compressive shear strength was found at 20° C. to be 175 kg./cm.$^2$.

Samples made in the same way were heated to 156° C. and then the compressive shear strength was measured at this temperature. No decrease in compressive shear strength as compared with that at 20° C. took place.

Comparative experiment

A solution of 0.8 g. of polystyrene in 8.6 of the ester of methacrylic acid with 5,6-dihydro-dicyclopentadienol (stabilized with 0.006% of hydroquinone) was mixed with 0.5 g. of a 70% commercial solution of cumene hydroperoxide in cumene and 0.1 g. of tributylamine.

Rust-free and oil-free bearing shafts made of steel (diameter 25 mm.) were joined with this mixture to steel cylinder rings (bore 25.2 mm., height 10 mm.).

After storing the sample at room temperature for 10 weeks, the compressive shear strength measured at 20° C. was 230 kg./cm.$^2$, and measured at 156° C. was 70 kg./cm.$^2$.

EXAMPLE 2

A mixture was prepared from 7.37 g. of tetrahydrofurfuryl methacrylate and 2.0 g. of methyl α-methacryloyloxyacrylate. The two monomers had been stabililized with 0.006% of hydroquinone. 0.5 g. of 70% commercial solution of cumene hydroperoxide in cumene and 0.1 g. of tributylamine and 0.03 g. of benzoic acid sulphimide were then added. The mixture was stable for months at room temperature in a half-filled bottle.

As in Example 1, steel bearing shafts were joined to cylinder rings with the mixture but the bore of the cylinder rings was 25.1 mm.

After storing the sample at room temperature for 10 days, the compressive shear strength measured at 20° C. was 120 kg./cm.$^2$ and at 106° C. was 60 kg./cm.$^2$.

Comparative experiment

Samples of the same kind and dimensions as described above were produced using an adhesive mixture of 9.37 g. of tetrahydrofurfuryl methacrylate (stabilized with 0.006% of hydroquinone), 0.5 g. of a 70% commercial solution of cumene hydroperoxide in cumene, 0.1 g. of tributylamine and 0.3 g. of benzoic acid sulphimide.

After storing at room temperature for 10 days, compressive shear strengths of the samples of 190 kg./cm.$^2$ at 20° C. and 17 kg./cm.$^2$ at 106° C. were measured.

EXAMPLE 3

A mixture was prepared from 6.37 g. of the acrylic acid ester of 5,6-dihydro-dicyclopentadienol and 2.0 g. of methyl α-methacryloyloxyacrylate. The two monomers had been stabilized with 0.006% of hydroquinone. To the mixture were added 0.5 g. of a 70% commercial solution of cumene hydroperoxide in cumene, 0.1 g. of tributylamine and 0.03 g. of benzoic acid sulphimide. The mixture was stable for months at room temperature in a half-filled bottle.

Rust-free and oil-free bearing shafts (steel: diameter 25 mm.) were joined with this mixture to cylinder rings (steel: bore 25.1 mm., height 10 mm.).

After storing the sample at room temperature for 10 days, compressive shear strengths of 160 kg./cm.$^2$ at 20° C. and 80 kg./cm.$^2$ at 156° C. were obtained.

Comparative experiment

Samples of the same kind and dimensions as described above were produced with a mixture of 9.37 g. of the acrylic acid ester of 5,6-dihydro-dicyclopentadienol, 0.5 g. of a 70% commercial solution and cumene hydroperoxide in cumene, 0.1 g. of tributylamine and 0.03 of benzoic acid sulphimide.

After storing for 10 days at room temperature, compressive shear strengths of the samples of 200 kg./cm.² at 20° C. and 50 kg./cm.² at 156° C. were measured.

The preceding specific embodiments are illustrative of the practice of the invention. It is to be understood however, that other expedients known to those skilled in the art may be employed without departing from the spirit of the invention or the scope of the appended claims.

EXAMPLE 4

A mixture was prepared from 8.6 g. of methyl α-methacryloyloxy-acrylate, 0.8 g. of polystyrene, 0.5 g. of a 70% commercial solution of cumene hydroperoxide in cumene, and 0.1 g. of tributylamine. This mixture was stable for months at room temperature in a half-filled bottle.

Rust-free and oil-free bearing shafts (steel: diameter 25 mm.) were joined to cylinder rings (steel: bore 25.1 mm., height 10 mm.) with this mixture.

After storing the sample at room temperature for 1 week, the compressive shear strength was found to be 95 kg./cm.², and at a temperature of 106° C. the compressive shear strength was found to be still 85 kg./cm.².

We claim:

1. Adhesive compositions hardenable under exclusion of oxygen consisting essentially of
   (a) at least about 60% by weight of liquid polymerizable esters consisting of
      (1) from 0 to 90% by weight of said liquid polymerizable esters of liquid esters of acids of the formula

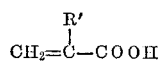

wherein R' is a member selected from the group consisting of hydrogen, lower alkyl and halogen with alcohols selected from the group consisting of cycloalkanols having from 4 to 7 carbon atoms, alkylcycloalkanols having 5 to 11 carbon atoms, cycloalkylalkanols having 5 to 11 carbon atoms, their mono and dioxa derivatives, 5,6-dihydrodicyclopentadienol, alkanediols having 2 to 12 carbon atoms, polyoxyethylene glycols, thiodialkylene glycols having from 4 to 8 carbon atoms, di-lower-alkanol-amines, and tri-lower-alkanol-amines, and
      (2) from 10% to 100% by weight of said liquid polymerizable esters of a compound of the formula

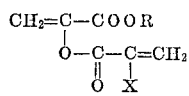

wherein X represents a member selected from the group consisting of hydrogen, halogen and lower alkyl and R represents a hydrocarbon having from 1 to 12 carbon atoms;
   (b) from 0.1% to 20% by weight of a percompound selected from the group consisting of organic hydroperoxides having from 3 to 18 carbon atoms and organic peroxides whose half life decomposition temperature after 10 hours is greater than 85° C.;
   (c) from 0 to 40% by weight of customary adhesive additives selected from the group consisting of thickeners, plasticizers, inorganic fillers and dyestuffs;
   (d) from 0 to 0.1% by weight of stabilizer polymerization inhibitors for polymerizable monomers; and
   (e) from 0 to 0.5% of accelerators;
   (f) from 0 to 5% by weight of other polymerizable unsaturated compounds selected from the group consisting of unsaturated organic acids, unsaturated organic acid amides and unsaturated organic polyesters.

2. The adhesive composition of claim 1 wherein said ingredient (a) (1) is present in an amount of from 55% to 90% by weight of said liquid polymerizable esters, and said ingredient (a) (2) is present in an amount of from 10% to 45% by weight of said liquid polymerizable esters.

3. The adhesive composition of claim 2 wherein R is methyl and X is methyl.

4. The adhesive composition of claim 3 wherein said alcohol is 5,6-dihydro-dicyclopentadienol.

5. The adhesive composition of claim 3 wherein said alcohol is tetrahydrofurfuryl alcohol.

6. The adhesive composition of claim 1 wherein said ingredient (d) is a stabilizer in an amount of from 0.001% to 0.1% by weight.

7. In the process of forming adhesive bonds between solid material comprising interposing a layer containing at least about 60% by weight of liquid polymerizable esters which harden under exclusion of oxides of oxygen of from 0 to 90% by weight of said liquid polymerizable esters of liquid esters of acids of the formula

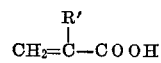

wherein R' is a member selected from the group consisting of hydrogen, lower alkyl and halogen, with alcohols, as defined in claim 1 said layer containing from about 0.1% to about 20% of an organic percompound selected from the group consisting of organic hydroperoxides having from 3 to 18 carbon atoms and organic peroxides whose half life decomposition temperature after 10 hours is greater than 85° C., between said solid materials and excluding oxygen from said layer, the improvement which consists in adding in an amount of from 10% to 100% of said liquid polymerizable esters of a compound of the formula

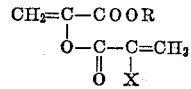

wherein X represents a member selected from the group consisting of hydrogen, halogen and lower alkyl and R represents a hydrocarbon having 1 to 12 carbon atoms.

8. The process of claim 7 wherein said compound is added in an amount of from 10% to 30% by weight, based on the total amount of said liquid polymerizable esters which harden under exclusion of oxygen.

References Cited

UNITED STATES PATENTS 2,499,393    3/1950    Kenyon et al. ____ 260—86.1 E
3,180,777    4/1965    Karo _____ 260—89.5 R HARRY WONG, JR., Primary Examiner U.S. Cl. X.R.

117—124, 132, 138.8, 161; 260—30.6, 30.8, 31.8, 33.4, 41, 78.5, 79.7, 80.3, 80.72, 80.73, 80.8, 80.81, 88.3, 89.5, 486, 879, 880, 884, 885, 886